(12) United States Patent
Alghamdi (10) Patent No.: US 12,281,551 B2
(45) Date of Patent: *Apr. 22, 2025

(54) SELF-ENCAPSULATED ELECTRICAL SUBMERSIBLE PUMP (ESP)

(71) Applicant: SAUDI ARABIAN OIL COMPANY, Dhahran (SA)

(72) Inventor: Anwar Salah S. Alghamdi, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 201 days.

This patent is subject to a terminal disclaimer.

(21) Appl. No.: 18/175,856

(22) Filed: Feb. 28, 2023

(65) Prior Publication Data

US 2024/0287882 A1 Aug. 29, 2024

(51) Int. Cl.
*E21B 43/12* (2006.01)
*E21B 41/00* (2006.01)
(Continued)

(52) U.S. Cl.
CPC ........ *E21B 43/128* (2013.01); *E21B 41/0042* (2013.01); *F04B 47/06* (2013.01);
(Continued)

(58) Field of Classification Search
CPC .. F04B 47/06; F04B 17/03; F04D 1/06; F04D 13/0693; F04D 13/10; F04D 29/406; F04D 29/605; E21B 43/128; E21B 41/0042

See application file for complete search history.

(56) References Cited

U.S. PATENT DOCUMENTS 9,175,692 B2 * 11/2015 Nowitzki ............... F04D 29/086
11,802,465 B2 * 10/2023 Alghamdi ............. E21B 43/128
(Continued)

FOREIGN PATENT DOCUMENTS

CA 3013189 A1 7/2017
EP 2356313 B1 12/2014

OTHER PUBLICATIONS

International Search Report issued for corresponding international patent application No. PCT/US2024/017289, mailed Aug. 7, 2024 (7 pages).

(Continued)

*Primary Examiner* — Charles G Freay
(74) *Attorney, Agent, or Firm* — Osha Bergman Watanabe & Burton LLP (57) ABSTRACT

An encapsulated apparatus includes an external housing and an internal housing. The external housing includes a plurality of components including a motor head, a motor, and a pump intake. The motor head has a fluid outlet configured to direct reservoir fluid out of the motor head. The motor head includes a power inlet configured to connect a power cable to an electric transmission system. The motor is connected to the motor head in contact with the reservoir fluid. The motor is powered by the electric transmission system. The pump intake is connected to the motor having a fluid inlet configured to direct the reservoir fluid from the fluid outlet into the fluid inlet. The internal housing is disposed in the external housing configured to be fluidly isolated from the reservoir fluid. The internal housing includes the electric transmission system.

19 Claims, 6 Drawing Sheets

(51) Int. Cl.
      *F04B 47/06*       (2006.01)
      *F04D 13/06*       (2006.01)
      *F04D 13/10*       (2006.01)
      *F04D 29/60*       (2006.01)
      *H02K 5/132*       (2006.01)
      *F04B 17/03*       (2006.01)
      *F04D 29/40*       (2006.01)

(52) U.S. Cl.
    CPC ......... *F04D 13/0693* (2013.01); *F04D 13/10* (2013.01); *F04D 29/605* (2013.01); *H02K 5/132* (2013.01); *F04B 17/03* (2013.01); *F04D 29/406* (2013.01)

(56) References Cited

U.S. PATENT DOCUMENTS

| | | | |
|---|---|---|---|
| 2006/0245957 A1 | 11/2006 | Berry et al. | |
| 2013/0277064 A1* | 10/2013 | Xiao | E21B 43/129 166/372 |
| 2023/0287749 A1* | 9/2023 | Alsaif | E21B 23/06 |

OTHER PUBLICATIONS

Written Opinion issued for corresponding international patent application No. PCT/US2024/017289, mailed Aug. 7, 2024 (12 pages).

* cited by examiner

SELF-ENCAPSULATED ELECTRICAL SUBMERSIBLE PUMP (ESP)

BACKGROUND

In hydrocarbon well development, it is common practice to use electrical submersible pumping systems (ESPs) as a primary form of artificial lift. It is common in the industry for ESP operations to require deep set packers where the ESP is located downhole from the packer. Deep set packers require a packer penetrator system to be used to pass the electrical power cable above and through the packer. The packer penetrator system introduces a weak point with a high percentage of ESP failure occurrence. A challenge with ESP operations with deep set packers is ESP failures due to reservoir fluid contact with the ESP electric transmission system below the packer.

Accordingly, there exists a need for a way to place the ESP above the packer to eliminate the use of packer penetrator systems while eliminating the reservoir fluid contact with the electric transmission system in the annulus of the well. In order to prevent reservoir fluid contact with the electric transmission system, an encapsulated apparatus is employed in the annulus of the well in which the electric transmission system is isolated from contact with the reservoir fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an encapsulated apparatus, the encapsulated apparatus comprising: an external housing comprising a plurality of components, wherein the plurality of components comprises: a motor head having a fluid outlet configured to direct a reservoir fluid out of the motor head, wherein the motor head comprises a power inlet configured to connect a power cable to an electric transmission system; a motor connected to the motor head in contact with the reservoir fluid, wherein the motor is powered by the electric transmission system; and a pump intake connected to the motor having a fluid inlet configured to direct the reservoir fluid from the fluid outlet into the fluid inlet; and an internal housing disposed in the external housing configured to be fluidly isolated from the reservoir fluid, wherein the internal housing comprises the electric transmission system, wherein the electric transmission system is in an environment inside the internal housing that is fluidly isolated from the reservoir fluid.

In one aspect, embodiments disclosed herein relate to an Electrical Submersible Pump (ESP) system for an encapsulated apparatus in a well, the system comprising: an ESP disposed in the well; and an encapsulated apparatus connected to the ESP, which is installed uphole from a production packer, the encapsulated apparatus comprising: an external housing comprising a plurality of components, wherein the plurality of components comprises: a motor head having a fluid outlet configured to direct a reservoir fluid out of the motor head, wherein the motor head comprises a power inlet configured to connect a power cable to an electric transmission system; a motor connected to the motor head in contact with the reservoir fluid, wherein the motor is powered by the electric transmission system in the power inlet; and a pump intake connected to the motor having a fluid inlet configured to direct the reservoir fluid from the fluid outlet into the fluid inlet; and an internal housing disposed in the external housing configured to be fluidly isolated from the reservoir fluid, wherein the internal housing comprises the electric transmission system, wherein the electric transmission system is in an environment inside the internal housing that is fluidly isolated from the reservoir fluid.

In one aspect, embodiments disclosed herein relate to a method of bypassing a section of a production tubing with an encapsulated apparatus, the method comprising: forming the encapsulated apparatus by connecting a plurality of components comprising: connecting, in an external housing, a motor head to a motor, wherein the motor head has a fluid outlet configured to direct a reservoir fluid out of the motor head, wherein the motor head comprises a power inlet configured to connect a power cable to an electric transmission system; wherein the motor is in contact with the reservoir fluid, wherein the motor is powered by the electric transmission system in the power inlet; connecting the motor to a pump intake; wherein the pump intake has a fluid inlet configured to direct the reservoir fluid from the fluid outlet into the fluid inlet; fluidly isolating an internal housing within the external housing from the reservoir fluid, disposing the electric transmission system within the internal housing, wherein the electric transmission system is disposed in an environment inside the internal housing that is fluidly isolated from the reservoir fluid, and installing the encapsulated apparatus so as to bypass the section of the production tubing.

Other aspects and advantages of the claimed subject matter will be apparent from the following description and the appended claims.

DETAILED DESCRIPTION

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to ESP assemblies. Specifically, one or more embodiments relate to encapsulated ESP assemblies, ESP Y-tool assemblies, and ESP pod assemblies. The ESP assemblies may provide an alternative option, a competitive solution, and an area of improvement to build on for future generation robust ESP systems.

In one or more embodiments, an encapsulated apparatus device may isolate ESP electrical connections from reservoir fluid to eliminate the use of packer penetrators. The encapsulated apparatus modifies the ESP assemblies to allow placing the ESP uphole from the packer to eliminate the packer penetrator systems and shroud installments, while isolating the ESP electric transmission system eliminating the reservoir fluid contact with the electric transmission system. In one or more embodiments, the encapsulated apparatus device may eliminate the use of flat power cables. Embodiments of the present disclosure may provide at least one of the following advantages. The present disclosure may eliminate multiple ESP failure points, increase ESP reliability, and increase meantime between failures. In one or more embodiments, the advantages may be beneficial in harsh environments where ESP failures related to H2S gas contents is dominant. Eliminating the requirement of workover rig intervention decreases the intervention costs and production losses.

Figure 1:
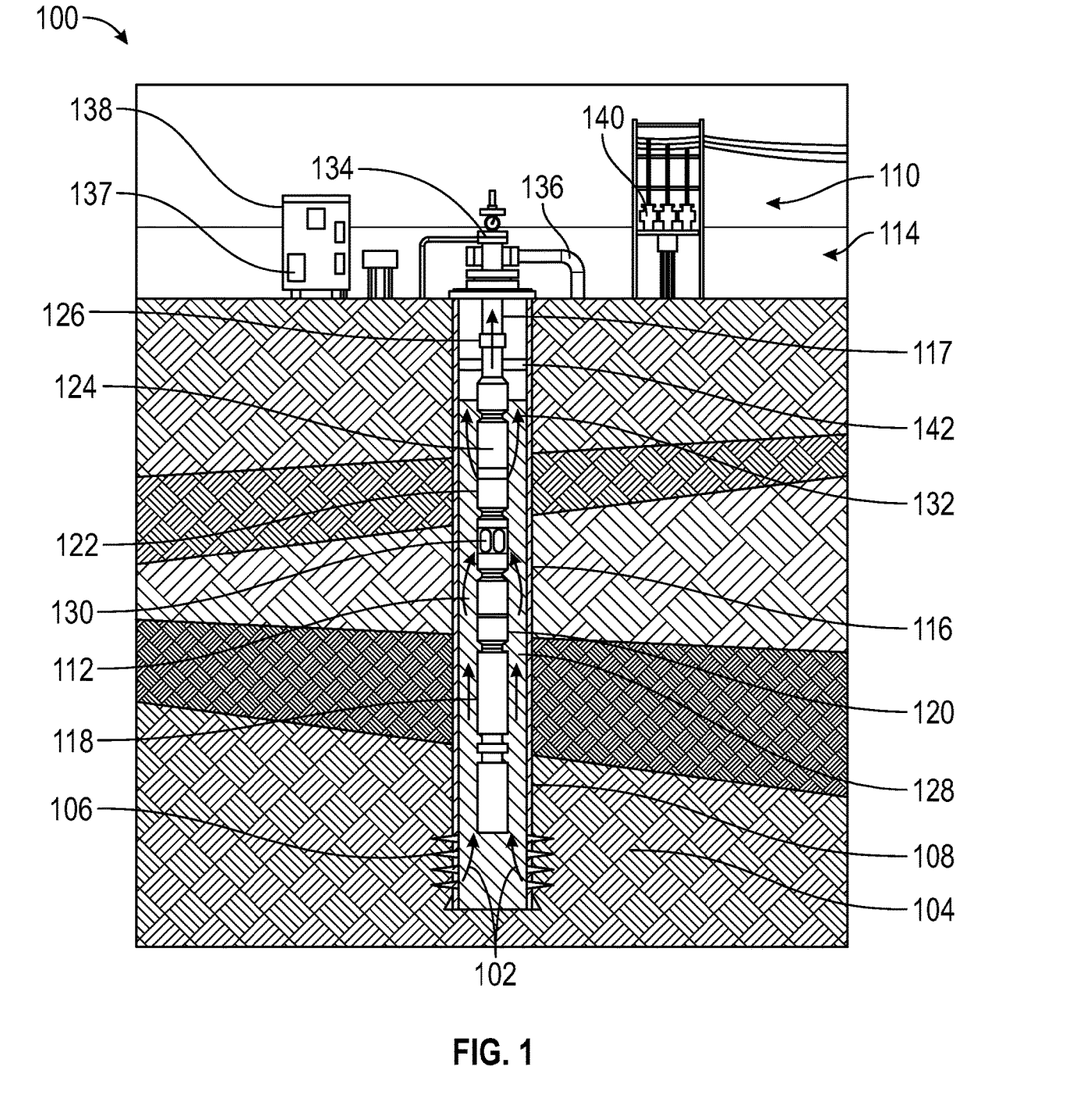
FIG. 1 shows an exemplary well with an Electrical Submersible Pump (ESP) completion design in accordance with one or more embodiments.

FIG. 1 shows an exemplary Electrical Submersible Pump (ESP) system (100). The ESP system (100) is one example of an artificial lift system that is used to help produce fluids (102) from a formation (104). The well (116) may be open hole or include perforations (106). Perforations (106) in the well's (116) casing string (108) provide a conduit for the reservoir fluids (102) to enter the well (116) from the formation (104). An ESP system (100) is an example of the artificial lift system, ESP system and artificial lift system may be used interchangeably within this disclosure. The ESP system (100) includes surface equipment (110) and an ESP string (112). The ESP string (112) is deployed in a well (116) on production tubing (117) and the surface equipment (110) is located on the surface (114). The production tubing (117) extends to the surface (114) and is made of a plurality of tubulars connected together to provide a conduit for reservoir fluids (102) to migrate to the surface (114). The surface (114) is any location outside of the well (116), such as the Earth's surface.

The ESP string (112) may include a motor (118), motor protectors (120), a gas separator (122), a multi-stage centrifugal pump (124) (herein called a "pump" or "ESP" (124)), and a power cable (126). The ESP string (112) may also include various pipe segments of different lengths to connect the components of the ESP string (112). The motor (118) is a downhole submersible motor (118) that provides power to the pump (124). The motor (118) may be a two-pole, three-phase, squirrel-cage induction electric motor (118). The motor's (118) operating voltages, currents, and horsepower ratings may change depending on the requirements of the operation.

The size of the motor (118) is dictated by the amount of power that the pump (124) requires to lift an estimated volume of reservoir fluids (102) from the bottom of the well (116) to the surface (114). The motor (118) is cooled by the reservoir fluids (102) passing over the motor housing. The motor (118) is powered by the power cable (126). The power cable (126) may also provide power to downhole pressure sensors or onboard electronics that may be used for communication. The power cable (126) is an electrically conductive cable that is capable of transferring information. The power cable (126) transfers energy from the surface equipment (110) to the motor (118). The power cable (126) may be a three-phase electric cable that is specially designed for downhole environments. The power cable (126) may be clamped to the ESP string (112) in order to limit power cable (126) movement in the well (116). The power cable (126) may be a single round power cable. The power cable (126) may be in the annulus between the production tubing (117) and casing string (108), from now on referred to as the annulus (128)". The annulus (128) is the space in the well (116) between the casing string (108) and the ESP string (112). In further embodiments, the ESP string (112) may have a hydraulic line that is a conduit for hydraulic fluid. The hydraulic line may act as a sensor to measure downhole parameters such as discharge pressure from the outlet of the pump (124).

Motor protectors (120) are located above (i.e., closer to the surface (114)) the motor (118) in the ESP string (112). The motor protectors (120) are a seal section that houses a thrust bearing. The thrust bearing accommodates axial thrust from the pump (124) such that the motor (118) is protected from axial thrust. The seals isolate the motor (118) from reservoir fluids (102). The seals further equalize the pressure in the annulus (128) with the pressure in the motor (118). The pump intake (130) is the section of the ESP string (112) where the reservoir fluids (102) enter the ESP string (112) from the annulus (128).

The pump intake (130) is located above the motor protectors (120) and below the pump (124). The depth of the pump intake (130) is designed based off of the formation (104) pressure, estimated height of reservoir fluids (102) in the annulus (128), and optimization of pump (124) performance. If the reservoir fluids (102) have associated gas, then a gas separator (122) may be installed in the ESP string (112) above the pump intake (130) but below the pump (124). The gas separator (122) removes the gas from the reservoir fluids (102) and injects the gas (depicted as separated gas (132) in FIG. 1) into the annulus (128). If the volume of gas exceeds a designated limit, a gas handling device may be installed below the gas separator (122) and above the pump intake (130).

The pump (124) is located above the gas separator (122) and lifts the reservoir fluids (102) to the surface (114). The pump (124) has a plurality of stages that are stacked upon one another. Each stage contains a rotating impeller and stationary diffuser. As the reservoir fluids (102) enter each stage, the reservoir fluids (102) pass through the rotating impeller to be centrifuged radially outward gaining energy in the form of velocity. The reservoir fluids (102) enter the diffuser, and the velocity is converted into pressure. As the reservoir fluids (102) pass through each stage, the pressure continually increases until the reservoir fluids (102) obtain the designated discharge pressure and has sufficient energy to flow to the surface (114).

A packer (142) is disposed around the ESP string (112). Specifically, the packer (142) may be located above (i.e., closer to the surface (114)) the multi-stage centrifugal pump (124) or downhole from the multi-stage centrifugal pump (124). The packer (142) may be any packer (142) known in the art such as a mechanical packer (142). The packer (142)

seals the annulus (128) space located between the ESP string (112) and the casing string (108). This prevents the reservoir fluids (102) from migrating past the packer (142) in the annulus (128). The environment inside the annulus (128) may be brine.

In other embodiments, sensors may be installed in various locations along the ESP string (112) to gather downhole data such as pump intake volumes, discharge pressures, shaft speeds and positions, and temperatures. The number of stages is determined prior to installation based of the estimated required discharge pressure. Over time, the formation (104) pressure may decrease and the height of the reservoir fluids (102) in the annulus (128) may decrease. In these cases, the ESP string (112) may be removed and resized. Once the reservoir fluids (102) reach the surface (114), the reservoir fluids (102) flow through the wellhead (134) into production equipment (136). The production equipment (136) may be any equipment that can gather or transport the reservoir fluids (102) such as a pipeline or a tank.

The remainder of the ESP system (100) includes various surface equipment (110) such as electric drives (137), production controller (138), the control module, and an electric power supply (140). The electric power supply (140) provides energy to the motor (118) through the power cable (126). The electric power supply (140) may be a commercial power distribution system or a portable power source such as a generator. The production controller (138) is made up of an assortment of intelligent unit-programmable controllers and drives which maintain the proper flow of electricity to the motor (118) such as fixed-frequency switchboards, soft-start controllers, and variable speed controllers. The production controller (138) may be a variable speed drive (VSD), well choke, inflow control valve, and/or sliding sleeves. The production controller (138) is configured to perform automatic well operation adjustments. The electric drives (137) may be variable speed drives which read the downhole data, recorded by the sensors, and may scale back or ramp up the motor (118) speed to optimize the pump (124) efficiency and production rate. The electric drives (137) allow the pump (124) to operate continuously and intermittently or be shut-off in the event of an operational problem.

Figure 2A:
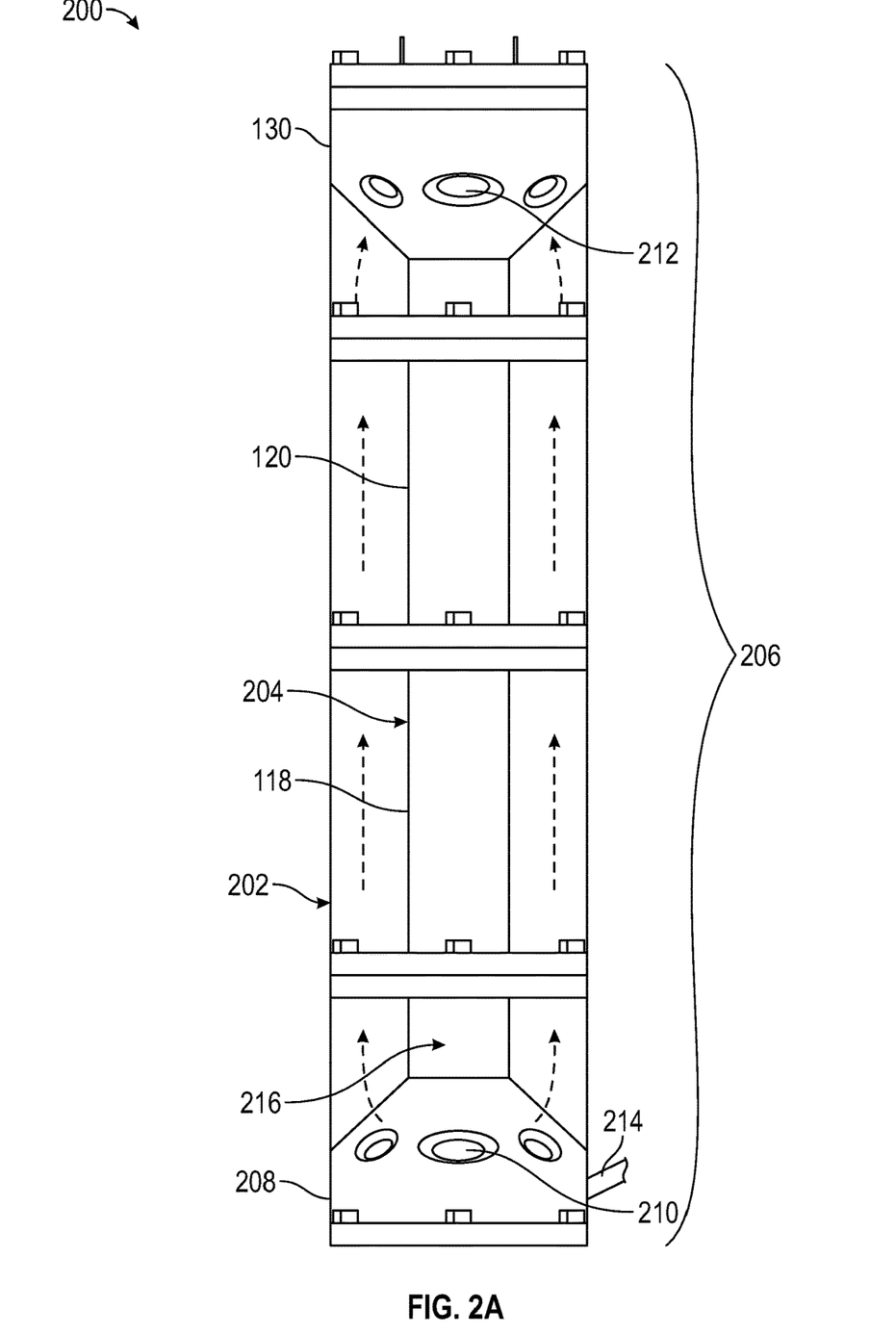
FIGS. 2A-2E show a device in accordance with one or more embodiments.

FIGS. 2A-2E show a device in accordance with one or more embodiments. FIG. 2A shows an encapsulated apparatus (200) in a whole view. The encapsulated apparatus (200) may be installed in the well (116) uphole from the packer (142). The encapsulated apparatus (200) may be in the annulus (128). The annulus (128) may be in a brine environment above the packer (142). A person of ordinary skill in the art may appreciate that the encapsulated apparatus (200) may be a pod system. The pod system may contain an external layer and an internal layer to form the encapsulated apparatus (200). Connections between parts of the encapsulated apparatus (200) may be any optimal connection such as thread connections or necks with connector flanges. The encapsulated apparatus (200) may be connected to the production tubing (117). The encapsulated apparatus (200) includes an external housing (202) and an internal housing (204). The external housing (202) and internal housing (204) may be any two or more layers of housing creating an encapsulation.

The external housing (202) includes a plurality of components (206) attached together. The components (206) may be attached with the production tubing (117). The components (206) include a motor head (208) connected to the motor (118) and the pump intake (130) connected to the motor (118). The motor (118) may be connected to a motor protector (120). The motor protector (120) may connect to the pump intake (130). The external housing (202) is in contact with reservoir fluid (e.g., reservoir fluids) (102). The motor head (208) may have a fluid outlet (210). The fluid outlet (210) may be any tubular opening configured to direct reservoir fluid (102) out of the motor head (208). The pump intake (130) may include a fluid inlet (212). The fluid inlet (212) may be any channel capable of accepting fluid into the pump intake (130). The fluid inlet (212) may be configured to direct the reservoir fluid (102) from the fluid outlet (210) into the fluid inlet (212).

The motor head (208) may have a power inlet (214). The power inlet (214) may extend from the internal housing (204) encapsulation out of the external housing (202) and into the annulus (128). The power inlet (214) may be designed to connect the power cable (126) to an electric transmission system (216) in the internal housing (204). The internal housing (204) is disposed in the external housing (202). The internal housing (204) is to be fluidly isolated from the reservoir fluid (102). The electric transmission system (216) may be isolated from the reservoir fluid (102). The electric transmission system (216) may be any electrical connection capable of powering the motor (118). The motor head (208) may connect to the motor (118) to deliver the electrical power received from the power cable (126) through the power inlet (214) and to the electric transmission system (216).).

The motor head (208) may include upstream and downstream flow paths to allow reservoir fluid (102) communication below the ESP (124) and inside the external housing (202) to the pump intake (130). The reservoir fluid (102) may enter into the external housing (202) through the motor head (208). The reservoir fluid (102) may flow through the fluid outlet (210) as shown by the arrows in FIG. 2A. The reservoir fluid (102) may flow past the motor (118) for cooling. The reservoir fluid (102) may flow into the fluid inlet (212) as shown by the arrows in FIG. 2A. The reservoir fluid (102) may exit the encapsulated apparatus (200) into the production tubing (117) through the pump intake (130). The encapsulated apparatus (200) may isolate the internal housing (204) with the electric transmission system (216) from contact with the reservoir fluid (102).

Figure 2B:
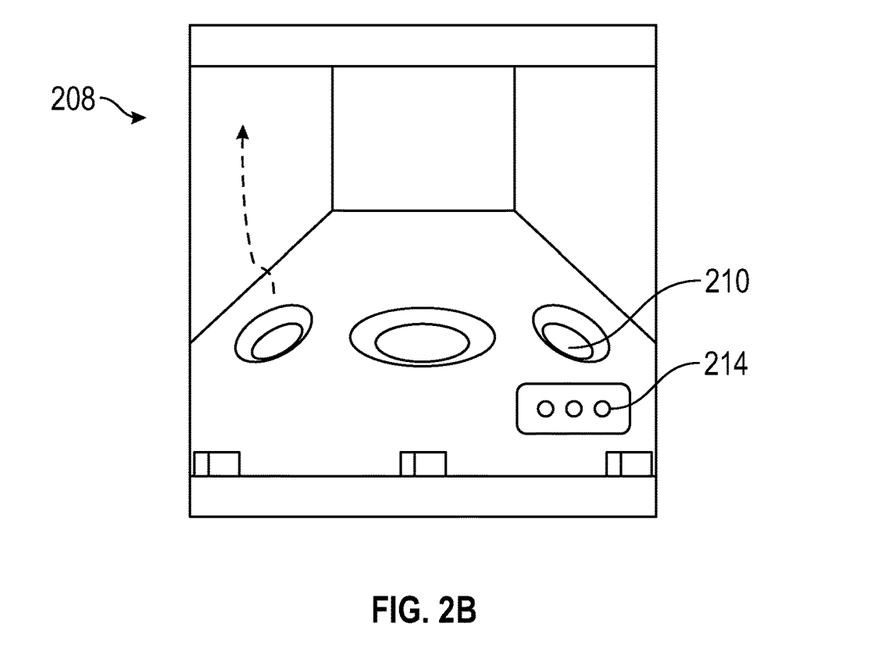
Figure 2C:
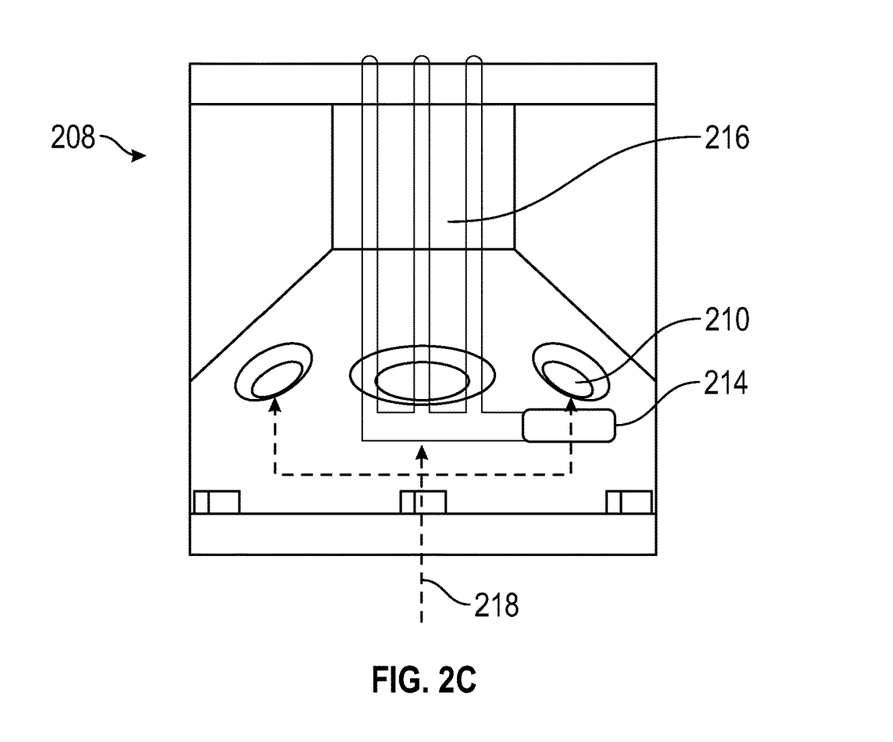

FIG. 2B shows the motor head (208) in the encapsulated apparatus (200). The motor head (208) includes the fluid outlet (210) to allow the reservoir fluid (102) to pass through the motor head (208) as shown by the arrow in FIG. 2B. FIG. 2C shows a cross sectional view of the motor head (208). FIG. 2C illustrates the electric transmission system (216) in the internal housing (204) connected to the power inlet (214). The power inlet (214) may allow for electrical communication between the power cable (126) and the electric transmission system (216). FIG. 2C shows the internal flow path of the reservoir fluid (102) in the motor head (208). The reservoir fluid (102) flows into the motor head (208) through a flow entry (218) and into the fluid outlet (210) as shown by the dashed arrows in FIG. 2C. The reservoir fluid (102) does not enter the internal housing (204) and is separated from the electrical path of the electric transmission system (216).

Figure 2D:
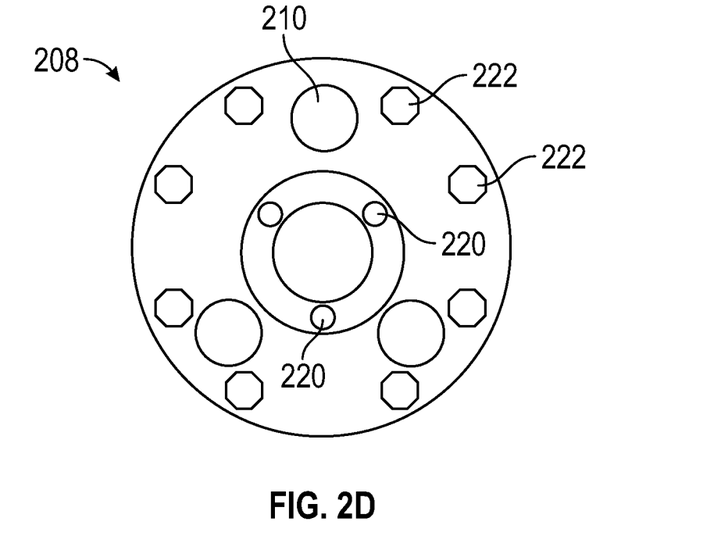
Figure 2E:
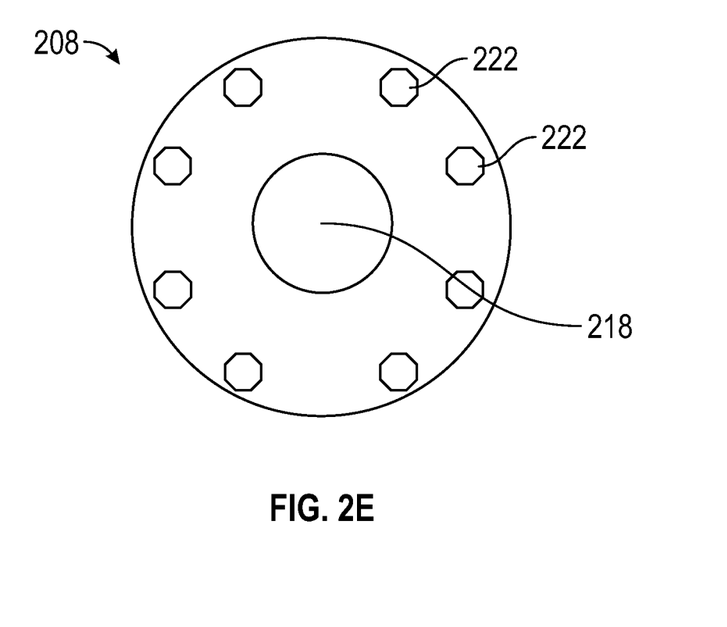

FIG. 2D shows a cross sectional top view schematic of the motor head (208). The motor head (208) may include phase pins (220). The phase pins (220) may pass electrical energy to any connected part of the ESP string (112), such as the motor (118). FIG. 2D shows the fluid outlet (210) for reservoir fluid (102) to flow through the motor head (208) and into the external housing (202). The motor head (208) may include a plurality of bolts (222). The bolts (222) may be used to attach the connector flanges (306). FIG. 2E shows a cross sectional bottom view schematic of the motor head (208). The motor head (208) may include a flow entry (218) for reservoir fluid (102) to enter from the production tubing (117) into the motor head (208).

Figure 3:
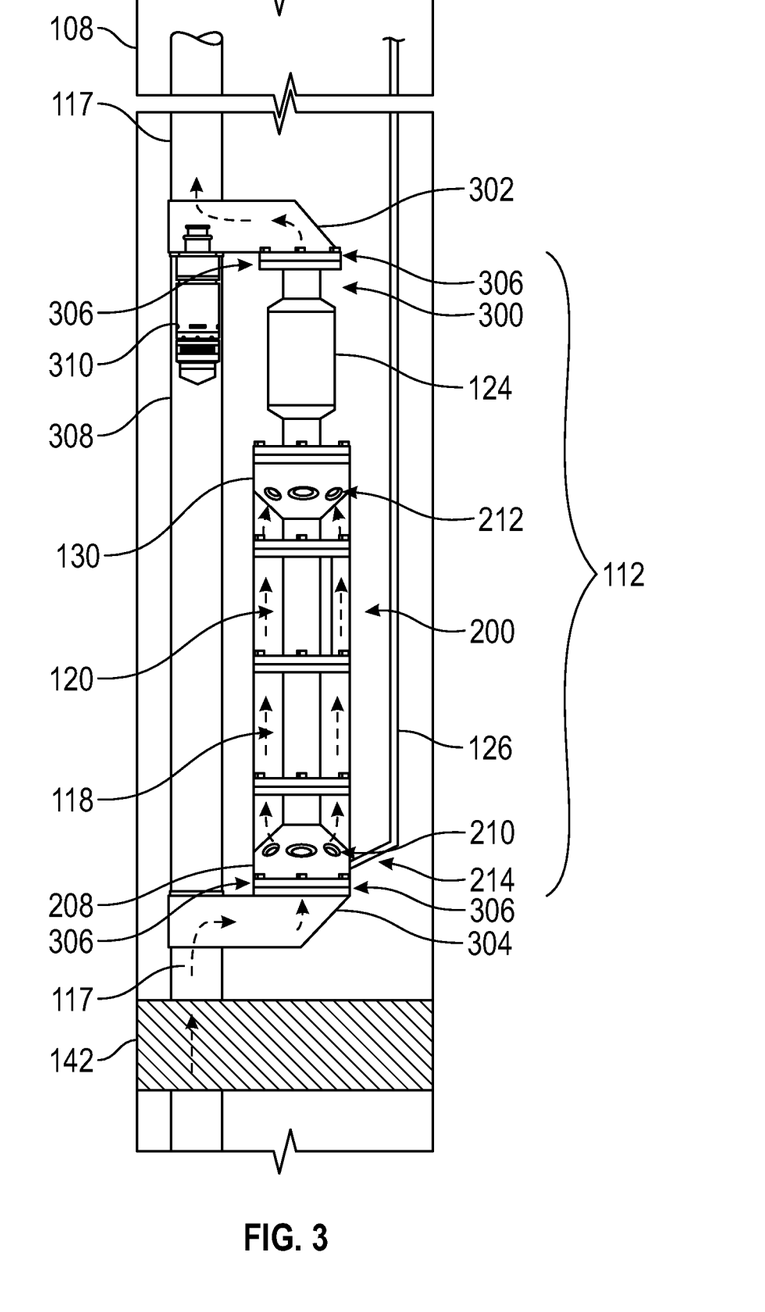
FIG. 3 shows a system in accordance with one or more embodiments.

FIG. 3 shows an example system for the encapsulated apparatus (200). Connections between parts of the system may be any optimal connectors such as thread connections or neck with connector flanges. The encapsulated apparatus (200) may be connected at the motor head (208) to the production tubing (117) extending downhole. The encapsulated apparatus (200) may be connected at the pump intake (130) to the ESP (124) and to the production tubing (117) extending to surface (114). The pump intake (130) in the encapsulated apparatus (200) may connect to the ESP (124). The ESP (124) may connect to a pump discharge (300). The pump discharge (300) may provide a threaded connection. The pump discharge (300) may provide the connection to the production tubing (117). The encapsulated apparatus (200) connected to the ESP (124) may form the ESP string (112). The example system in FIG. 3 shows the packer (142) set downhole from the ESP string (112). The reservoir fluid (102) may travel from the production tubing (117) or formation (104) into the ESP string (112). The reservoir fluid (102) may enter into the motor head (208) through the fluid outlet (210). The reservoir fluid (102) may flow past the motor (118) for cooling purposes and into the fluid inlet (212) of the pump intake (130). The reservoir fluid (102) remains in contact with the external housing (202) during flow through the encapsulated apparatus (200). The internal housing (204) remains isolated from contact with the reservoir fluid (102). The reservoir fluid (102) may flow from the pump intake (130) through the ESP (124) and into the production tubing (117) to travel to surface (114).

One of ordinary skill in the art may appreciate the encapsulated apparatus in a system may include an alternative design with a y-tool option to allow rig-less intervention below the ESP (124). The example system in FIG. 3 shows a y-tool option to allow rig-less well intervention downhole from the ESP (124). The y-tool system includes a bypass tubing (308) with two y-tool blocks connected from the top and bottom of the ESP (124) rather than directly to the production tubing (117) without y-tool blocks. FIG. 3 shows the y-tool blocks as an upper y-tool (302) and a lower y-tool (304). Either of the upper y-tool (302) and the lower y-tool (304) may be considered a "first" y-tool and the other may be considered a "second" y-tool.

The motor head (208) may include one or more connector flanges (306). The connector flanges may hydraulically connect the motor head (208) with the lower y-tool (304). The motor head (208) may have a tubular opening at the bottom where the connector flanges (306) contact. The contact of the connector flanges (306) may allow fluid communication between the connector flanges (306). The pump discharge (300) may include a connector flange (306) to connect to the upper y-tool (302). The upper y-tool (302) may hydraulically connect the ESP (124) to the production tubing (117). The power cable (126) may connect to the power inlet (214) and extend to surface (114) to provide the necessary electric energy to power the ESP system (100). The reservoir fluid (102) may travel through the lower y-tool (304) and upper y-tool (302) within external housing (202) in the encapsulated apparatus (200). The reservoir fluid (102) may flow from the ESP string (112) through the upper y-tool (302) into the production tubing (117). The length in the production tubing (117) between the upper y-tool (302) and the lower y-tool (304) may define a bypass tubing (308). The bypass tubing (308) may be connected in the production tubing (117) between the upper y-tool (302) and the lower y-tool (304) to provide an alternative path for the reservoir fluid (102) between the upper y-tool (302) and lower y-tool (304) if necessary. The bypass tubing (308) may be any tubing capable of connecting the production tubing (117) between the upper y-tool (302) and lower y-tool (304). The bypass tubing (308) may be used for rig-less well interventions. The bypass tubing (308) may include a blanking plug (310). The blanking plug (310) may be any plug used to isolate the flow path in the bypass tubing (308) if necessary. The blanking plug (310) may be retrieved and returned in place as needed.

The encapsulated apparatus (200) in the y-tool system may be an alternative to the currently known pod system in wells with smart well completion (SWC).

Figure 4:
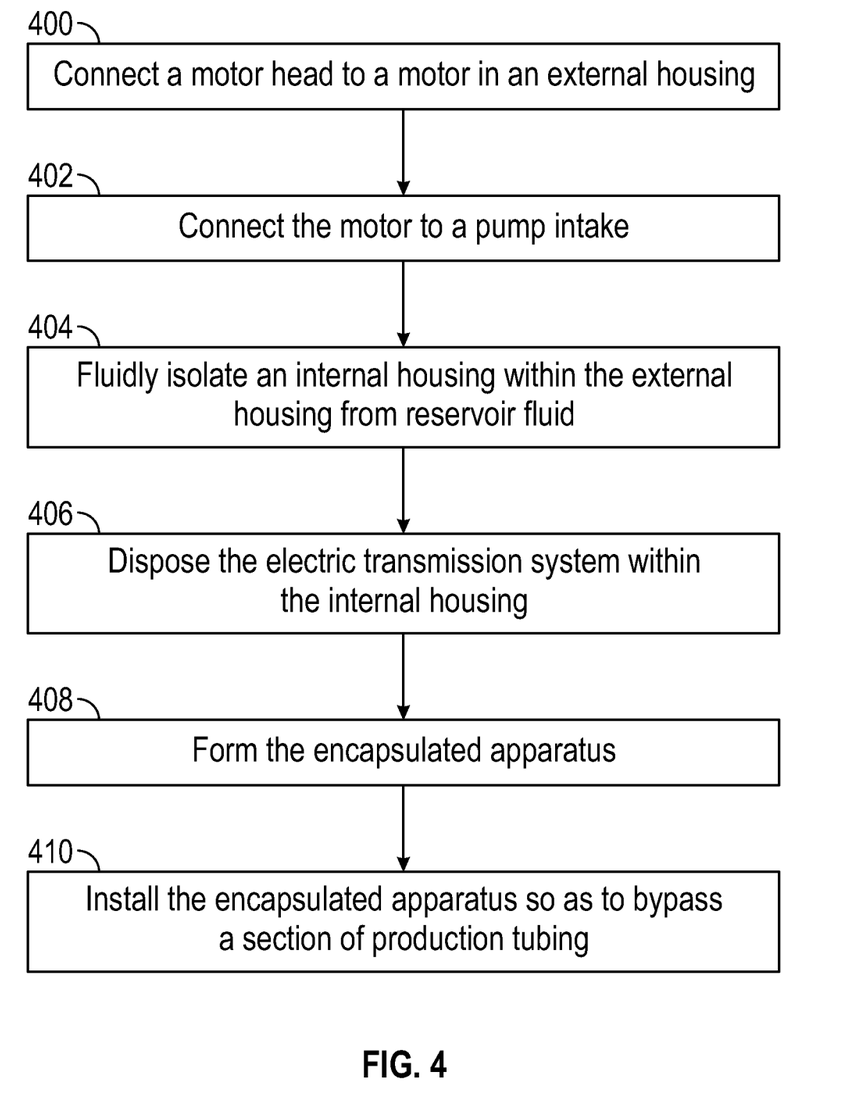
FIG. 4 shows a flowchart in accordance with one or more embodiments.

FIG. 4 shows a flowchart in accordance with one or more embodiments. FIG. 4 shows a method for bypassing a section of a production tubing (117) with the encapsulated apparatus (200). One or more blocks in FIG. 4 may be performed using one or more components as described in FIGS. 1 through 3. While the various blocks in FIG. 4 are presented and described sequentially, one of ordinary skill in the art will appreciate that some or all of the blocks may be executed in parallel and/or iteratively. Furthermore, the blocks may be performed actively or passively.

In Block 400, a motor head (208) is connected to a motor (118) in an external housing (202). The motor (118) has a fluid outlet (210) configured to direct reservoir fluid (102) out of the motor head (208). The motor (118) has a power inlet (214) configured to connect a power cable (126) to an electric transmission system (216). The motor (118) is in contact with the reservoir fluid (102). The motor (118) is powered by the electric transmission system in the power inlet (214). The motor head (208) may have a plurality of phase pins (220) configured to pass electrical energy to the motor (118) from the power cable (126). The motor head (208) may be hydraulically connected to the production tubing (117) by a lower y-tool (304) with a first set of plurality of connector flanges (306). The production tubing (117) may be plugged by a blanking plug (310) to isolate the lower y-tool from the production tubing (117). The motor head (208) may have a plurality of bolts (222) to attach to the first set of a plurality of connector flanges (306).

In Block 402, the motor (118) is connected to a pump intake (130). The pump intake (130) has a fluid inlet (212) configured to direct the reservoir fluid (102) from the fluid outlet (210) into the fluid inlet (212). The pump intake (130) may be hydraulically connected to an ESP (124) with a second set of plurality of connector flanges (306). The ESP (124) may be connected to the production tubing by an upper y-tool (302).

In Block 404, internal housing (204) is fluidly isolated within the external housing (202) from the reservoir fluid (102).

In Block 406, the electric transmission system (216) is disposed within the internal housing (204). The electric transmission system (216) is disposed in an environment inside the internal housing (204) that is fluidly isolated from the reservoir fluid (102).

In Block 408, the encapsulated apparatus (200) is formed from blocks 400 through 406 by connecting the plurality of components (206). The encapsulated apparatus (200) may be a pod system. In Block 410, the encapsulated apparatus (200) is installed so as to bypass a section of the production tubing (117).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An encapsulated apparatus, the encapsulated apparatus comprising:
   an external housing encapsulating a plurality of components, wherein the plurality of components comprises:
      a motor head having a fluid outlet, wherein the motor head comprises a power inlet configured to connect a power cable to an electric transmission system;
      a motor connected to the motor head, the motor being in contact with a reservoir fluid, wherein the motor is powered by the electric transmission system; and
      a pump intake connected to the motor having a fluid inlet; and
   an internal housing disposed in the external housing configured to be internally fluidly isolated from the reservoir fluid, wherein the internal housing surrounds the electric transmission system,
   wherein an annular space is defined between the external housing and the internal housing configured to direct the reservoir fluid out of the motor head, via the fluid outlet, and into the pump intake, via the fluid inlet,
   wherein the electric transmission system is in an environment inside the internal housing that is fluidly isolated from the reservoir fluid,
   wherein the motor head comprises a plurality of phase pins configured to pass electrical energy to the motor from the power cable.

2. The encapsulated apparatus in claim 1, wherein the encapsulated apparatus is a pod system comprising an external layer and an internal layer.

3. An Electrical Submersible Pump (ESP) system for an encapsulated apparatus in a well, the system comprising:
   an ESP disposed in the well; and
   an encapsulated apparatus connected to the ESP, which is installed uphole from a production packer, the encapsulated apparatus comprising:
      an external housing encapsulating a plurality of components, wherein the plurality of components comprises:
         a motor head having a fluid outlet, wherein the motor head comprises a power inlet configured to connect a power cable to an electric transmission system;
         a motor connected to the motor head, the motor being in contact with a reservoir fluid, wherein the motor is powered by the electric transmission system in the power inlet;
         a pump intake connected to the motor having a fluid inlet; and
      an internal housing disposed in the external housing configured to be internally fluidly isolated from the reservoir fluid, wherein the internal housing surrounds the electric transmission system,
      wherein an annular space is defined between the external housing and the internal housing configured to direct the reservoir fluid out of the motor head, via the fluid outlet, and into the pump intake, via the fluid inlet,
      wherein the electric transmission system is in an environment inside the internal housing that is fluidly isolated from the reservoir fluid.

4. The system in claim 3, wherein the ESP is connected to a pump discharge.

5. The system in claim 3, wherein the motor head comprises a plurality of phase pins configured to pass electrical energy to the motor from the power cable.

6. The system in claim 3, wherein the encapsulated apparatus is a pod system comprising an external layer and an internal layer.

7. The system in claim 3, wherein the ESP system is in a production tubing in the well.

8. The system in claim 3, wherein the ESP system is connected to a production tubing in the well by a first y-tool and a second y-tool by a plurality of connector flanges.

9. The system in claim 8, wherein the motor head comprises a plurality of bolts to attach to one of the plurality of connector flanges.

10. The system in claim 8, wherein the first y-tool hydraulically connects the ESP to the production tubing.

11. The system in claim 10, wherein the second y-tool hydraulically connects the motor head to the production tubing.

12. The system in claim 11, wherein a length in the production tubing between the first y-tool and the second y-tool defines a bypass tubing.

13. The system in claim 12, wherein the bypass tubing comprises a blanking plug configured to isolate the bypass tubing from the reservoir fluid.

14. A method of bypassing a section of a production tubing with an encapsulated apparatus, the method comprising:
   forming the encapsulated apparatus by connecting a plurality of components comprising:
   connecting, in an external housing, a motor head to a motor,
      wherein the motor head has a fluid outlet,
      wherein the motor head comprises a power inlet configured to connect a power cable to an electric transmission system;
      wherein the motor is in contact with a reservoir fluid,
      wherein the motor is powered by the electric transmission system;
   connecting the motor to a pump intake;
      wherein the pump intake has a fluid inlet;
   internally fluidly isolating an internal housing within the external housing from the reservoir fluid;
   directing the reservoir fluid, via an annular space defined between the external housing and the internal housing, out of the motor head, via the fluid outlet, and into the pump intake, via the fluid inlet,
   disposing the electric transmission system within the internal housing,
      wherein the electric transmission system is disposed in an environment inside the internal housing that is fluidly isolated from the reservoir fluid, and
   installing the encapsulated apparatus so as to bypass the section of the production tubing.

15. The method of claim 14, the method further comprising:
- hydraulically connecting the motor head to the production tubing by a first y-tool with a first of connector flange; and
- hydraulically connecting the pump intake to an electrical submersible pump (ESP) with a second connector flange,
- wherein the ESP is connected to the production tubing by a second y-tool.

16. The method of claim 15, the method further comprising:
- plugging the production tubing by a blanking plug to isolate the first y-tool from the production tubing.

17. The method of claim 15, wherein the motor head comprises a plurality of bolts to attach to the first connector flange.

18. The method of claim 14, wherein the encapsulated apparatus is a pod system comprising an external layer and an internal layer.

19. The method in claim 14, wherein the motor head comprises a plurality of phase pins configured to pass electrical energy to the motor from the power cable.

\* \* \* \* \*